United States Patent

Holzmann et al.

[19]

[11] Patent Number: 6,061,812
[45] Date of Patent: May 9, 2000

[54] METHODS AND APPARATUS FOR GENERATING PASSIVE TESTERS FROM PROPERTIES

[75] Inventors: Gerard J. Holzmann, Murray Hill; Mihalis Yannakakis, Summit, both of N.J.

[73] Assignee: Lucent Technologies Inc., Murray Hill, N.J.

[21] Appl. No.: 09/054,470

[22] Filed: Apr. 3, 1998

[51] Int. Cl.[7] .................................................. G06F 11/00
[52] U.S. Cl. .................................................. 714/38; 717/4
[58] Field of Search .................................. 714/38, 25, 31, 714/33, 35, 37, 39, 46; 712/25; 717/4

[56] References Cited

U.S. PATENT DOCUMENTS

| | | | |
|---|---|---|---|
| 4,694,408 | 9/1987 | Zaleski | 701/33 |
| 5,446,652 | 8/1995 | Peterson et al. | 364/578 |
| 5,640,537 | 6/1997 | Jessen et al. | 395/500 |

*Primary Examiner*—Ly V. Hua

[57] ABSTRACT

Techniques and testers for testing a system U including the steps of (a) defining a formal specification of a logical property P that system U is required not to satisfy; (b) generating a passive testing module T based upon property P to monitor system U; (c) invoking a function F at specific invocation points during the execution of system U to compute an abstract representation of the state of system U at the current point of execution; (d) passing the abstract representation computed by function F to passive testing module T in order to determine whether the abstract representation of the execution of system U to the current point matches illegal property P; and (e) declaring a "fail" result if the abstract representation of the execution of system U to the current point matches illegal property P and declaring a "pass" result if the abstract representation of the execution of system U to the current point does not match illegal property P.

20 Claims, 5 Drawing Sheets

METHODS AND APPARATUS FOR GENERATING PASSIVE TESTERS FROM PROPERTIES

BACKGROUND OF THE INVENTION

1. Field of the Invention

The present invention relates generally to improvements in the field of software testing, and in particular to testers for use with software systems.

2. Description of the Prior Art

Manually constructed passive testers are known in the art. They typically test for the reachability of predetermined failure states. To our knowledge, no method has been previously described or used for passive testers of liveness properties, i.e., temporal properties that capture specific patterns of traversal of system states in the system under test. Similarly, conformance testing is also known in the art and documented in the literature. In a conformance test, one tests a model against an implementation, for conformance. A representative reference describing the prior art is Lee et al., "Passive Testing and its Applications to Network Management," Proc. ICNP '97 (IEEE Int. Conference on Network Protocols), October 1997. There is no known testing method in which one tests for specific logical "properties."

SUMMARY OF THE INVENTION

One embodiment of the present invention provides a method for testing a system U including the steps of (a) defining a formal specification of a logical property P that system U is required not to satisfy; (b) generating a passive testing module T based upon property P to monitor system U; (c) invoking a function F at specific invocation points during the execution of system U to compute an abstract representation of current state of system U at the current point of execution; (d) passing the abstract representation computed by function F to passive testing module T in order to determine whether the abstract representation of the execution of system U to the current point matches illegal property P; and (e) declaring a "fail" result if the abstract representation of the execution of system U to the current point matches illegal property P and declaring a "pass" result if the abstract representation of the execution of system U to the current point does not match illegal property P.

Additional features and advantages of the present invention will become apparent by reference to the following detailed description and accompanying drawings.

DETAILED DESCRIPTION

The present invention uses correctness "properties" to generate runtime monitors. In this approach, correctness properties are expressed as linear temporal logic (LTL) formulae. An encoded procedure is generated from each formula, which is then included as a runtime monitor. The monitor is imbedded inside the implementation, if possible. However, if desired, the monitor may be implemented as an external module, e.g., as a component added to a network with multiple nodes and links. The implementation is then instrumented to inform the monitor at the occurrence of the events that the monitor is interested in, namely those events that are relevant to the truth-value of the correctness property. The monitor complains if it sees an execution that violates a stated correctness property.

In a preferred embodiment of the present invention, a formal statement of a property P is used to generate a passive testing module T that participates and monitors the executions of a computer program, or a system of concurrently executing and interacting computer programs, referred to as U, the "system under test," given as input.

Figure 1:
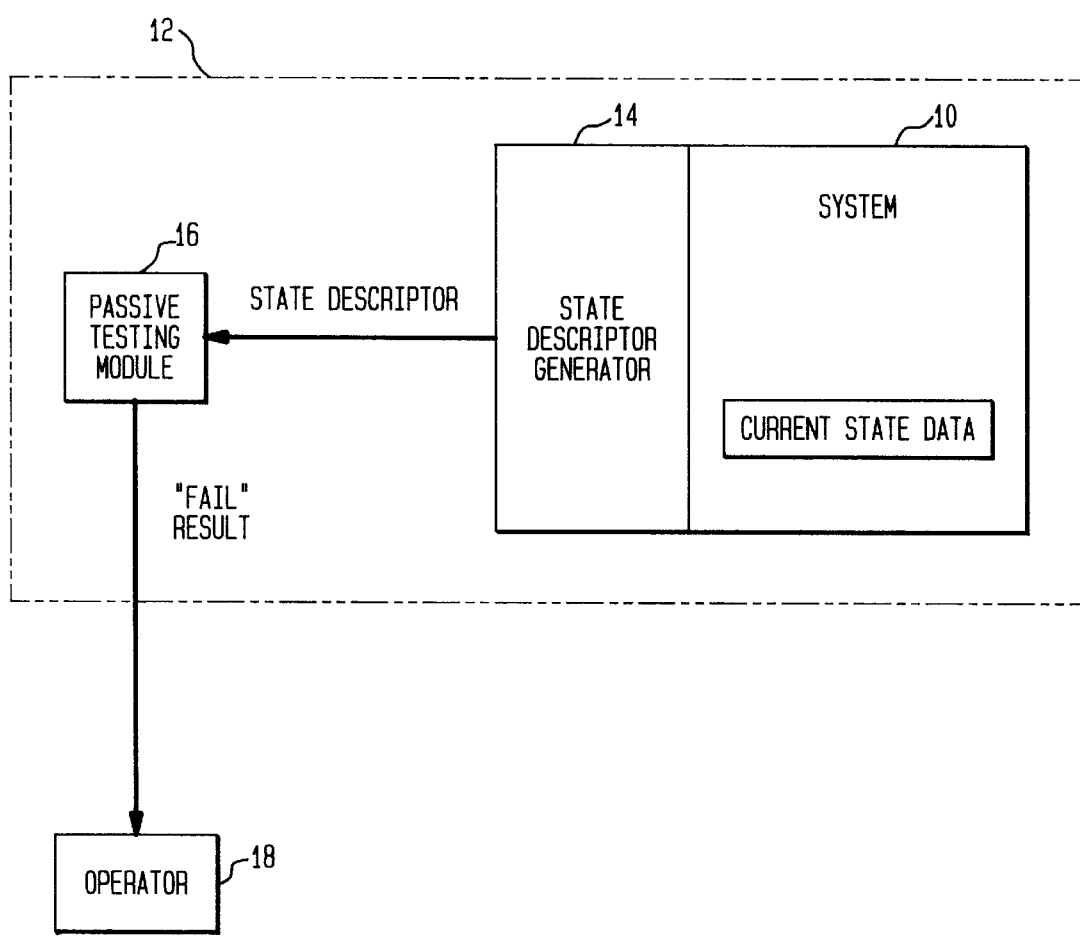
FIG. 1 shows a diagram of a preferred embodiment of a testing system according to the present invention.

FIG. 1 shows a diagram of the present invention. System 10 is a computer program, or a system of concurrently executing and interacting computer programs, operating in a hardware environment 12 that includes processing and storage means known in the art. A state descriptor generator 14, implemented in software, receives or has access to current state data from system 10 and then generates a "state descriptor," which is an abstract representation of the state of the system at the current point of execution. The state descriptor is then passed to a passive testing module 16, also implemented in software. As described below, the passive testing module 16 is generated from correctness properties and determines whether the state descriptor indicates that a failure has occurred. In a preferred embodiment, the state descriptor generator 14 and the passive testing module 16 are imbedded within the implementation. However, as described above, the testing module may also be external to the implementation, as would be the case, for example, where the testing module is added to an already existing network, or element of a network. In such a case, element 12 in FIGS. 1 and 2 would represent the overall network. In the FIG. 1 embodiment, only a "fail" result is reported to the operator 18.

Figure 2:
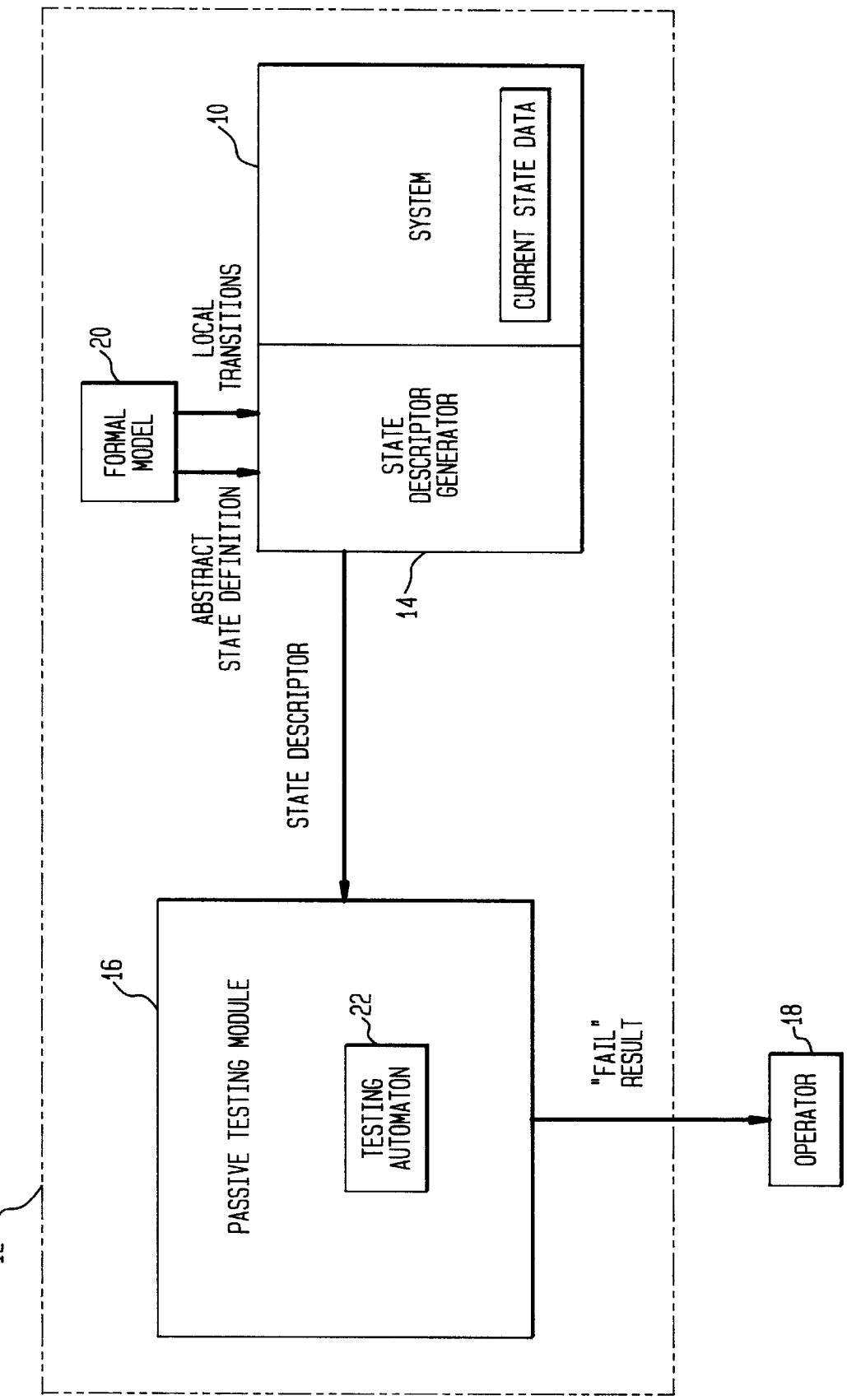
FIG. 2 shows an alternative embodiment of a testing system according to the present invention.

FIG. 2 shows an alternative embodiment of the invention, which includes a formal model 20 of system 10 disposed between system 10 and state descriptor generator 14. Further, in FIG. 2, passive testing module 16 includes a testing automaton 22. These elements are described in greater detail below.

Figure 3:
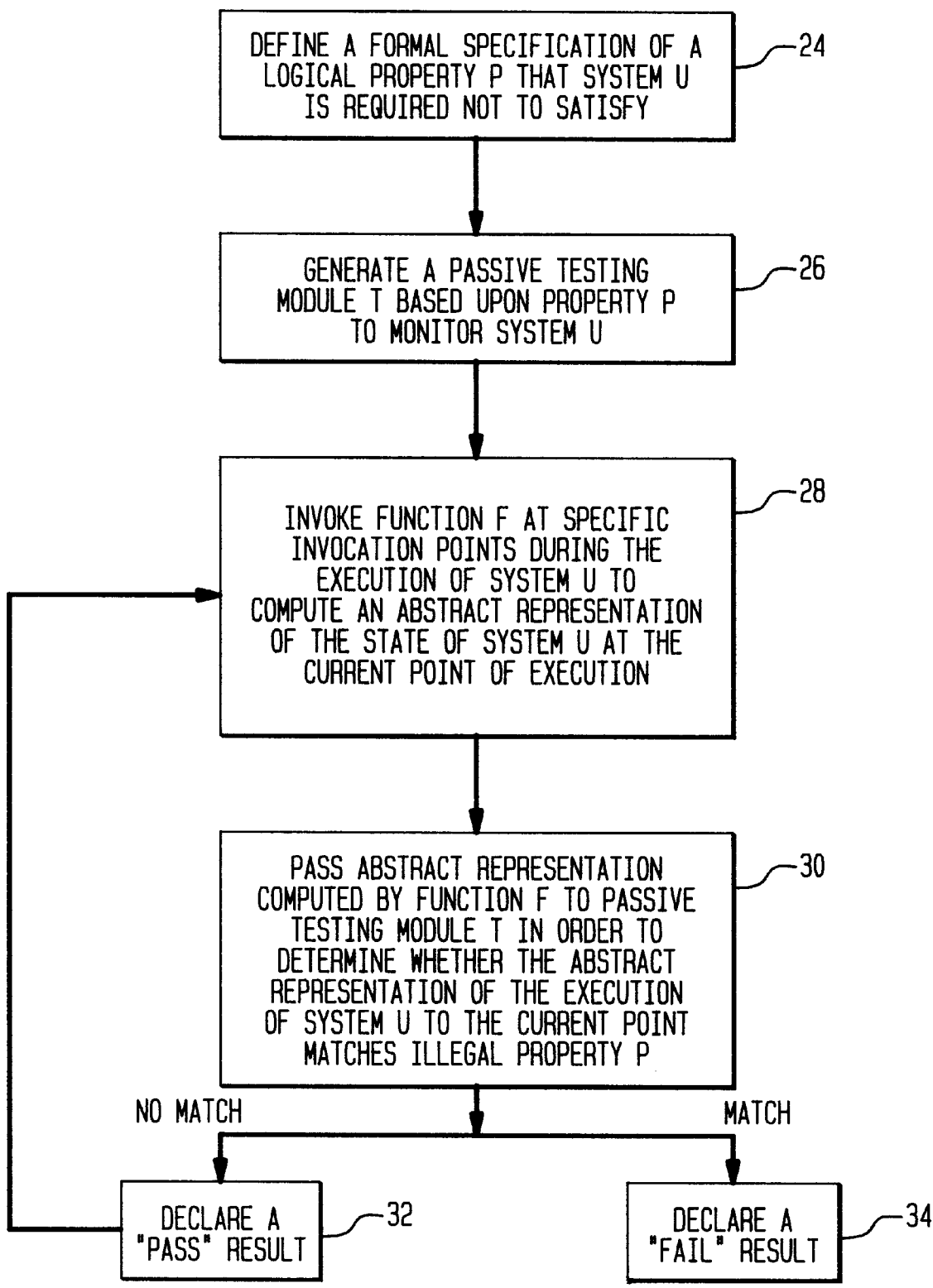
FIG. 3 shows a flowchart of a preferred embodiment of a testing method according to the present invention.

FIG. 3 shows a method according to a preferred embodiment of the present invention. Given a system U to be tested, the first step 24 is to define a property P. P is a formal specification of a logical property that the system is required not to satisfy. That is, property P formalizes an erroneous behavior of U that is required to be unrealizable. The preferred notation for the property is Linear Temporal Logic (LTL).

The second step 26 of the method is to generate a passive testing module T, based upon property P, to perform runtime monitoring of system U. In a preferred embodiment, testing module T is embedded in the implementation.

Figure 4:
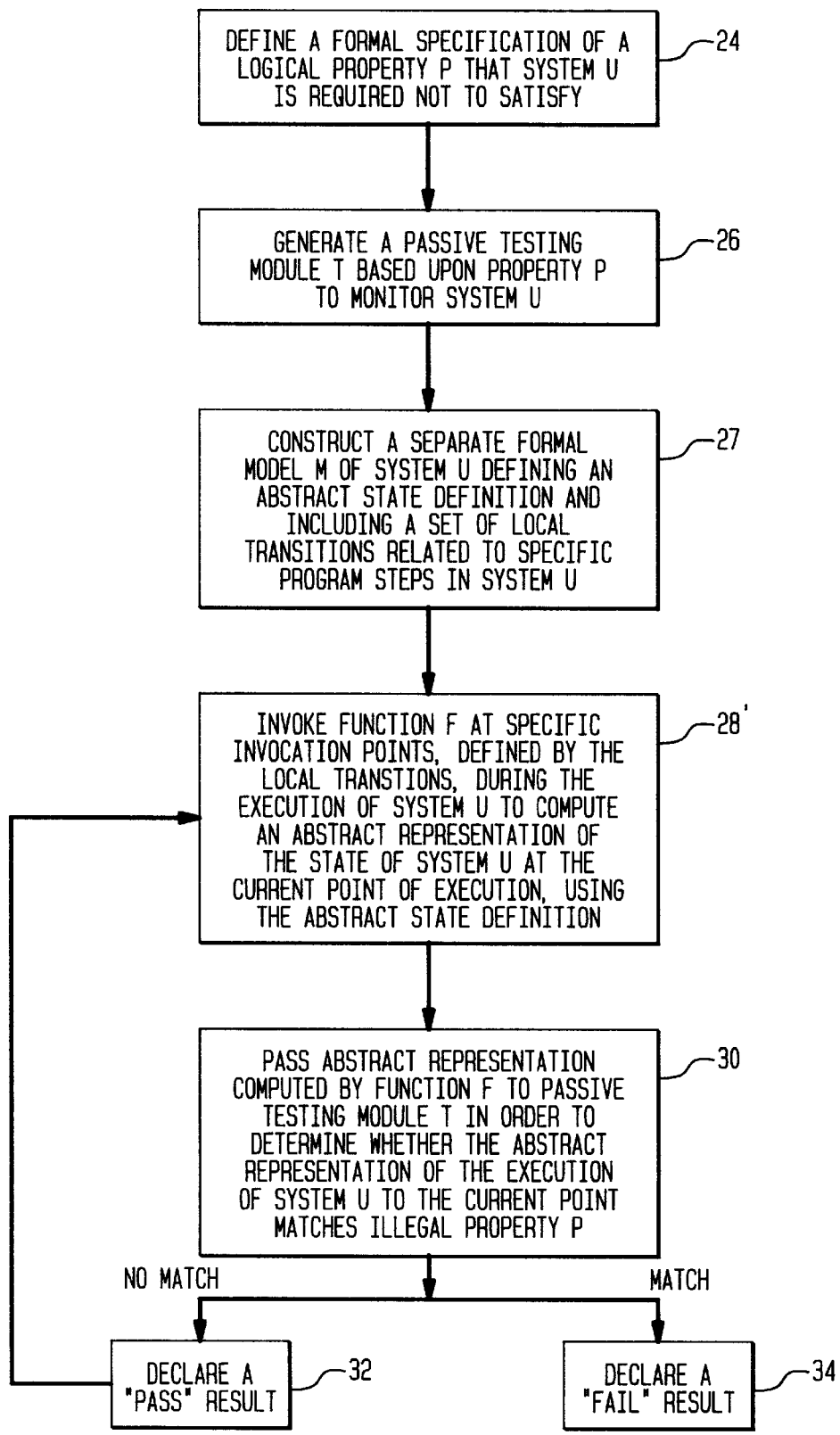
FIG. 4 shows a flowchart of an alternative embodiment of a testing method according to the present invention.

In the third step 28, a function F, not necessarily written in the same language as system U, computes an abstract representation of the current system state of U during its execution, at specific invocation points. To define F, two things have to be determined: (1) the precise way in which it computes an abstract "state descriptor" from the full current state data of system U; and (2) the precise "invocation points" during the execution of system U where F is to be invoked. Both issues can be optionally settled with the help of a separately constructed formal model M, or they can be determined experimentally without the help of such a model. Formal model M defines an abstract definition of the current state of system U. Each local transition in M is related, by the model's construction, to a specific (possibly a series of) program step(s) in system U. The use of formal model M is illustrated in FIG. 4, which shows an alternative embodiment of the method shown in FIG. 3. In FIG. 4, the formal model is constructed in step 36. Also, FIG. 4 includes step 28', which is a modified version of step 28 appearing in FIG. 3.

State Descriptor: Upon each invocation of function F, a small state descriptor is constructed from the current state of U at the point of invocation. The "current state" of system U can encompass all of the data that is accessible to all elements of system U to make control decisions. The "state descriptor" that F computes is that selection of the available information that is relevant to the test of property P. Ideally, F should include the information that is needed to determine the truth of P, as well as any other state information that the system U uses to control its execution. Any information not relevant to P can be ignored. The selection can contain abstracted information, e.g., by capturing the "number" of messages queued in a channel, but not the "message contents" itself, or by recording whether an integer data item is odd or even, instead of recording its full numeric value. This state descriptor is passed to the routine F that is generated from property P in a manner to be described below. Of course, in a simple implementation, it would be possible for F to pass all state information to T, without change. When a formal model M of system U is used, the abstract state description defined in M is used in F. This is illustrated in steps 36 and 28' of FIG. 4. The accuracy of the model can be verified independently with standard model verification tools, such as the Bell Labs model checker SPIN, described in Holzmann, "The Model Checker SPIN," IEEE Transactions on Software Engineering, Vol. 3, No. 5, May 1997.

Invocation Points: In a simple implementation, function F could be called once for every program step in system U. By a casual inspection of the system under test, though, the number of invocations can be reduced to those steps where a state change happens that may be relevant to property P. As illustrated in steps 36 and 28' of FIG. 4, if a formal model M is used, the steps in system U that should be followed by an invocation of F are defined by the set of local transitions that appear in model M.

In the fourth step 30, the abstract representation computed by function F is passed to passive testing module T, which is forced to make a step, in order to determine whether the abstract representation matches illegal property P. After each step, T will declare either a "pass" or a "fail" result, 32, 34. A "pass" result 32 means that the test will continue because tester T has not yet been able to detect an execution error, i.e., a match of the stated illegal property P. As shown in FIG. 1, if a "pass" result issues 32, system U continues to operate until the next point for invoking function F. A "fail" result 34 means that tester T has determined that system U, as monitored by function F, can satisfy (i.e., match) illegal property P. Once a "fail" result has been issued 34, this result persists throughout until either (1) the execution reaches completion or (2) system U is reinitialized (i.e., reset or restarted), whichever occurs first. If the tester is no longer able to track system execution, it places itself in an offline state, where it will issue only "pass" results, until system U is reinitialized.

The reason for a "fail" is a match of the current execution of U with the invalid behavior formalized in P. The underlying cause could be the existence of a true implementation error in system U, or an error in the definition of P or F (i.e., the detection of an error in the definitions that are used to generate and drive the tester T), or in the determination of the invocation points for F (described further below). In each case, the source of error can be determined by the human tester observing the results. The test is repeated until it no longer fails. As in all tests, an absence of failure does not imply assured correctness of system U. It means only that U did not exhibit execution errors as formalized in P and as detectable by T through interface F.

Returning to step 20 in FIG. 3, property P is preferably expressed in linear temporal logic (LTL), that is, it is built from a finite number of Boolean propositions based upon the abstract representation of the state of system U, as computed by function F. In each such state, each Boolean proposition in F evaluates to either true or to false. These propositions can be combined with standard logical and temporal operators to form temporal logic formulae, which can express potentially complex logic properties of finite or infinite system executions. If the formula expresses a positive property (i.e., a desired execution pattern), it is first negated by standard Boolean negation. If the formula expresses a negative property (i.e., an invalid execution pattern), it is used as is.

The passive testing module T may be generated using the Spin/PROMELA system, which has an LTL translator that can produce a non-deterministic automaton TA from an input requirement expressed as an LTL formula, i.e., property P, using a standard conversion procedure known in the literature. One such procedure is disclosed in Gerth et al., "Simple On-the-fly Automatic Verification of Linear Temporal Logic," Proc. Symp. on Protocol Specification Testing and Verification, Warsaw, Poland, 1995, pp. 3–18 (Publ. Chapman & Hall, London, England). The automaton TA is then encoded as a function, preferably but not necessarily, in the same programming language that is also used to define F and U.

When the T routine is invoked by F, it evaluates all propositions, and decides whether or not to effect a state change in the property automaton TA that is derived from property P. The definition of TA, as produced by the translation procedure, dictates unambiguously which state changes of TA are needed. Because the property automaton TA is non-deterministic, more than one control state may need to be recorded as the local automaton state of TA at each step. The automaton state for TA persists across invocations of T.

The automaton TA implemented in T can contain simple error states, that upon being reached, can instantly trigger a "fail" result. Such states can be used to capture all "safety properties," e.g., violations of property P that depend only on the current state of U, and not on a specific pattern of repetition of states.

For more general temporal logic properties, the automaton TA generated by the translation procedure will generally also contain "accepting states," that, according to the property, must be detected to be part of an execution cycle in system U, as far as these can be observed through the interface provided by F, and are relevant to P.

Figure 5:
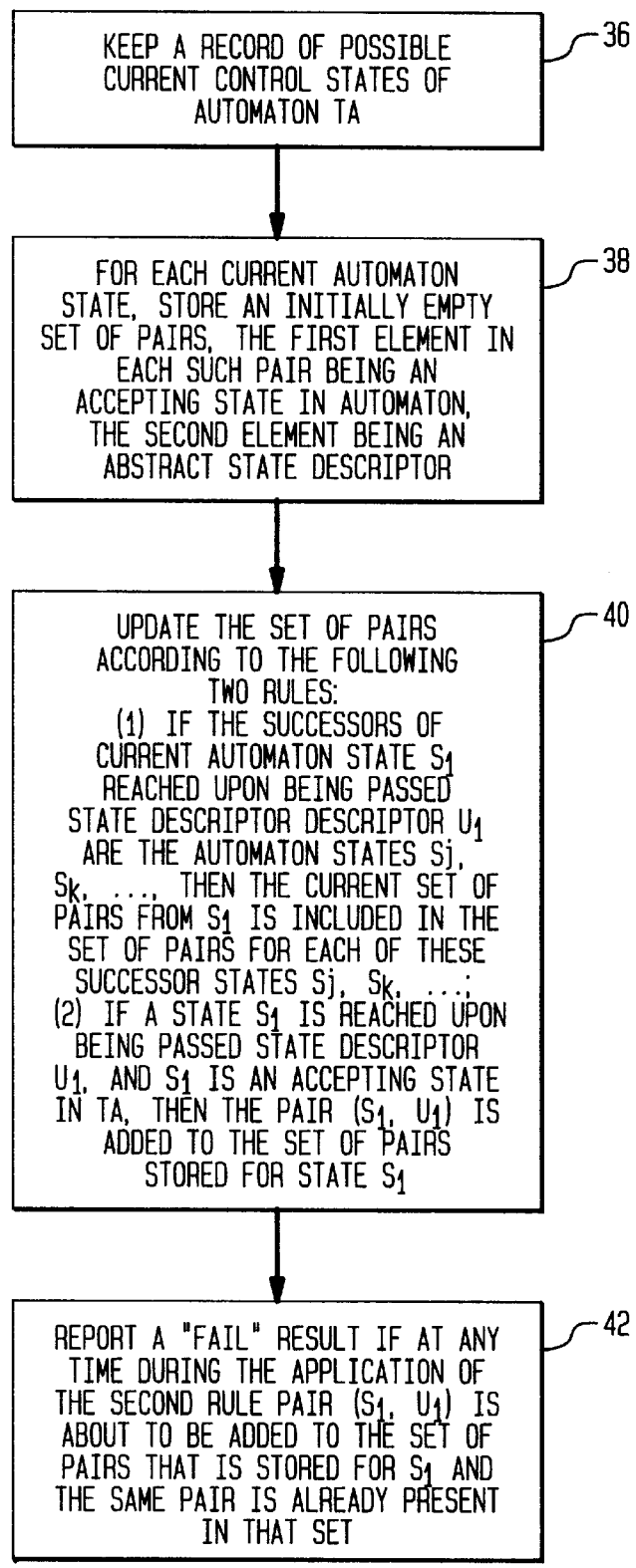
FIG. 5 shows a flowchart of a method according to the present invention for establishing the execution by the system of an accepting cycle.

FIG. 5 illustrates a process that may be suitably employed to establish the possible existence of such "accepting cycles." In step 38, during execution, the tester T stores in memory a record of the possible current control states of automaton TA. In step 40, for each current automaton state in TA, tester T stores an initially empty set of pairs. The first element in each such pair is an accepting state in TA; the second element of each pair is an abstract state descriptor, as passed to T by F. In step 42, during normal execution, these sets are updated after each invocation of F using the rules given below. All sets are reset to empty on the reinitialization of U.

The following two rules determine how the sets for TA are updated:

First, if the successors of current automaton state $s_1$ reached upon being passed state descriptor $u_i$ are the automaton states $s_j, s_k, \ldots$ (there can be zero or more such successor states), then the current set of pairs from $s_i$ is included in the set of pairs for each of these successor states $s_j, s_k, \ldots$ Second, if a state $s_i$ is reached upon being passed state descriptor $u_i$, and $s_i$ is an accepting state in TA, then the pair $(s_i, u_i)$ is added to the set of pairs stored for state $s_i$.

As shown in step 44 of FIG. 5, if at any time during execution the second rule applies, that is, the pair $(s_i, u_i)$ is about to be added to the set of pairs that is stored for $s_i$, and the same pair is already present in that set, then a "fail" result is provided as an output which can be, as desired, displayed, printed out, or stored for a later report.

When no "fail" can be reported, a "pass" is reported by T. The "pass" will generally be "silent" (i.e., only a "fail" needs to lead to an externally visible action of tester T.

The method described here has the following features, provided that the function F captures the necessary information on the state of system U that is relevant to the satisfaction of property P:

If system U does not have the undesired property P, then in any execution of U, the tester T will report "pass" at every step.

If system U does have property P, and an execution of U exhibits this property P, then the tester will report "fail" at some step (indeed, at the earliest step that this can be conclusively determined given the available observation seen through F up to that point).

If system U is not correct, but the particular execution of U that is monitored by tester T happens to be "correct" for P (i.e., it does not match P), then the tester T may or may not report a "fail."

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for testing a software system U, comprising:
   (a) defining a formal specification of a logical property P that system U is required not to satisfy;
   (b) generating a passive testing module T based upon property P to monitor system U;
   (c) invoking a function F at specific invocation points during the execution of system U to compute an abstract representation of the state of system U at the current point of execution;
   (d) passing the abstract representation computed by function F to passive testing module T in order to determine whether the abstract representation of the execution of system U to the current point matches illegal property P;
   (e) declaring a "fail" result if the abstract representation matches illegal property P and declaring a "pass" result if the abstract representation of the execution of system U to the current point does not match illegal property P.

2. A method according to claim 1, wherein steps (b)–(e) are repeated if a "pass" result in declared in step (e).

3. A method according to claim 1, wherein in step (c), the abstract representation is a small state descriptor constructed from the current state of system U at the point of invocation, the small state descriptor comprising a selection of available information relevant to the testing for property P.

4. A method according to claim 3, further including the following step (c1) performed prior to step (c):
   (c1) constructing a separate formal model M of system U, formal model M defining an abstract state definition;
   and wherein, in step (c), function F uses the abstract state definition defined by formal model M to compute an abstract representation of the state of system U at the current point of execution.

5. A method according to claim 1, wherein in step (c), the number of invocation points is reduced to those steps in system U where a state change happens that may be relevant to property P.

6. A method according to claim 5, further including the following step (c1) performed prior to step (c):
   (c1) constructing a separate formal model M of system U, formal model M including a set of local transitions;
   and wherein, in step (c), the invocation points are defined by the set of location transitions included in formal model M.

7. A method according to claim 1, wherein property P is expressed in linear temporal logic and is built from a finite number of Boolean propositions based upon the abstract representation of the state of system U as computed by function F.

8. A method according to claim 1, wherein the passive testing module T includes a non-deterministic automaton TA, which is generated by an LTL translator from property P expressed as an LTL formula.

9. A method according to claim 8, wherein the automaton TA contains simple error states that upon being reached instantly trigger a "fail" result.

10. A method according to claim 8, wherein the automaton contains accepting cycles, the execution of any of which by the system triggers a "fail" result.

11. A method according to claim 10, wherein the following method is used to establish the execution by the system of an accepting cycle:
    keeping a record of possible current control states of automaton TA;
    for each current automaton state in automaton TA, storing an initially empty set of pairs, the first element in each such pair being an accepting state in automaton TA, the second element of each such pair being an abstract state descriptor, as passed to passive tester T by function F;
    updating the set of pairs according to the following two rules:
    first, if the successors of current automaton state $s_i$ reached upon being passed state descriptor $u_i$ are the automaton states $s_j, s_k, \ldots$, then the current set of pairs from $s_i$ is included in the set of pairs for each of these successor states $s_j, s_k, \ldots$;

second, if a state $s_i$ is reached upon being passed state descriptor $u_i$, and $s_i$ is an accepting state in TA, then the pair $(s_i, u_i)$ is added to the set of pairs stored for state $s_i$;

reporting a "fail" result if at any time during the application of the second rule pair $(s_i, u_i)$ is about to be added to the set of pairs that is stored for $s_i$ and the same pair is already present in that set.

12. A tester for testing a software system U, comprising:

a passive testing module T that is based upon a formal specification of a logical property P that system U is required not to satisfy;

a state descriptor generator that receives, or has access to, current state data from software system U and computes an abstract representation of the state of system U at the current point of execution, a passive testing module T that is based upon a formal specification of a logical property P that system U is required not to satisfy, the passive testing module receiving as an input the abstract representation to the passive testing module in order to determine whether the abstract representation of the execution of system U to the current point matches illegal property P;

means for declaring a "fail" result if the abstract representation of the execution of system U to the current point matches illegal property P and declaring a "pass" result if the abstract representation of the execution of system U to the current point does not match illegal property P.

13. A tester according to claim 12, wherein the abstract representation generated by the state descriptor generator comprises a selection of available information relevant to the testing for property P.

14. A tester according to claim 12, further including a formal model M of system U, formal model M defining an abstract state definition used by the state descriptor generator to compute the abstract representation of the state of system U at the current point of execution.

15. A tester according to claim 12, further including a formal model M of system U, formal model M including a set of local transitions which are used by the state descriptor generator to define the invocation points.

16. A tester according to claim 12, wherein property P is expressed in linear temporal logic and is built from a finite number of Boolean propositions based upon the abstract representation of the state of system U as computed by function F.

17. A tester according to claim 12, wherein the passive testing module T includes a non-deterministic automaton TA, which is generated by an LTL translator from property P expressed as an LTL formula.

18. A tester according to claim 17, wherein the automaton TA contains simple error states that, upon being reached, instantly trigger a "fail" result.

19. A tester according to claim 17, wherein the automaton TA contains accepting cycles, the execution of any of which by the system triggers a "fail result."

20. A tester according to claim 19, further includes means for establishing the execution by the system of an accepting cycle, comprising:

means for keeping a record of possible current control states of automaton TA;

means for storing, for each current automaton state in automaton TA, an initially empty set of pairs, the first element in each such pair being an accepting state in automaton TA, the second element of each such pair being an abstract state descriptor, as passed to passive tester T by function F;

means for updating the set of pairs according to the following two rules:

first, if the successors of current automaton state $s_i$ reached upon being passed state descriptor $u_i$ are the automaton states $s_j$, $s_k$, . . . ; included in the set of pairs for each of these successor states $s_j$, $s_k$, . . . ;

second, if a state $s_i$ is reached upon being passed state descriptor $u_i$ and $s_i$ is an accepting state in TA, then the pair $(s_i, u_i)$ is added to the set of pairs stored for state $s_i$;

means for reporting a "fail" result if at any time during the application of the second rule pair $(s_i, u_i)$ is about to be added to the set of pairs that is stored for $s_i$ and the same pair is already present in that set.

* * * * *